United States Patent
Biondi et al.

(10) Patent No.: US 12,226,804 B2
(45) Date of Patent: Feb. 18, 2025

(54) SUPPORT FOR TRANSPORTING CONTAINERS IN A MICROWAVE INSPECTION DEVICE AND A DEVICE AND METHOD OF INSPECTION OF CONTAINERS USING THE SUPPORT

(71) Applicant: G.D S.P.A., Bologna (IT)

(72) Inventors: Andrea Biondi, Bologna (IT); Luca Cavazza, Bologna (IT); Luca Cerati, Bologna (IT); Claudia De Maria, Bologna (IT); Giacomo Noferini, Castenaso (IT); Stefano Sinigardi, Roncoferraro (IT); Noemi Zordan, Bologna (IT)

(73) Assignee: G.D S.P.A., Bologna (IT)

( * ) Notice: Subject to any disclaimer, the term of this patent is extended or adjusted under 35 U.S.C. 154(b) by 0 days.

(21) Appl. No.: 17/922,260

(22) PCT Filed: Jul. 16, 2021

(86) PCT No.: PCT/IB2021/056431
§ 371 (c)(1),
(2) Date: Oct. 28, 2022

(87) PCT Pub. No.: WO2022/038430
PCT Pub. Date: Feb. 24, 2022

(65) Prior Publication Data
US 2023/0173547 A1    Jun. 8, 2023

(30) Foreign Application Priority Data

Aug. 18, 2020  (IT) .......................... 102020000018712

(51) Int. Cl.
*B07C 5/34*    (2006.01)
*B07C 5/344*   (2006.01)

(52) U.S. Cl.
CPC ...... *B07C 5/344* (2013.01); *B65G 2201/0261* (2013.01)

(58) Field of Classification Search
None
See application file for complete search history.

(56) References Cited

U.S. PATENT DOCUMENTS

| 4,533,038 A | 8/1985 | Richard |
| 4,864,848 A * | 9/1989 | Irvine ................. G01M 3/3218 73/49.3 |

(Continued)

FOREIGN PATENT DOCUMENTS

EP    0503576 A1    9/1992

OTHER PUBLICATIONS

International Search Report and Written Opinion dated Oct. 18, 2021 from counterpart International Application No. PCT/IB2021/056431.

*Primary Examiner* — Joseph C Rodriguez
(74) *Attorney, Agent, or Firm* — SHUTTLEWORTH & INGERSOLL, PLC; Timothy J. Klima (57) ABSTRACT

A support for transporting containers in a microwave inspection device, including a supporting body which can be moved along a feed path and at least two receiving seats connected to the top of the supporting body to be moved along said feed path, wherein said supporting body has two or more supporting portions (S1, S2) which are at least partly separated from each other by one or more openings and each carrying at least one respective receiving seat, said supporting portions (S1, S2) being connected or integral with each other in a lower region of the supporting body.

10 Claims, 5 Drawing Sheets

(56) References Cited

U.S. PATENT DOCUMENTS

| | | | | |
|---|---|---|---|---|
| 5,067,616 A | * | 11/1991 | Plester | G01N 21/9081 |
| | | | | 209/567 |
| 5,305,887 A | * | 4/1994 | Krieg | G01N 21/3504 |
| | | | | 209/523 |
| 5,418,170 A | * | 5/1995 | Rounbehler | G01N 35/00 |
| | | | | 436/172 |
| 11,345,498 B2 | * | 5/2022 | Cerati | B65B 1/44 |
| 2002/0023506 A1 | * | 2/2002 | Miyamoto | G01R 31/016 |
| | | | | 73/865.8 |
| 2023/0348205 A1 | * | 11/2023 | Biondi | B65G 47/847 |

* cited by examiner

SUPPORT FOR TRANSPORTING CONTAINERS IN A MICROWAVE INSPECTION DEVICE AND A DEVICE AND METHOD OF INSPECTION OF CONTAINERS USING THE SUPPORT

This application is the National Phase of International Application PCT/IB2021/056431 filed Jul. 16, 2021 which designated the U.S.

This application claims priority to Italian Patent Application No. 102020000018712 filed Aug. 18, 2020, which application is incorporated by reference herein.

TECHNICAL FIELD

This invention relates to a support for transporting containers in a microwave inspection device, as well as a device and a method for inspecting containers which use this support, in particular containers of the type containing a pre-dosed quantity of a material in granular or powder form for making food products, for example, a lyophilized food material (meat or vegetable stock or the like) or a granulated material for making an infusion drink- and still more specifically, capsules for making such foods.

BACKGROUND ART

Typically, capsules for infusion drinks-coffee, for example—are inspected using check weighers disposed along a capsule feed line, downstream of a machine that makes the capsules. The purpose of weighing is to check that the capsules contain the desired quantity of product and that they therefore conform to a predetermined production standard.

In prior art production lines, the capsules are transferred between the different production stations (loading, dosing, sealing, etc) using trays or suitable support plates provided with housings to hold a plurality of capsules.

In prior art applications, the use of in-line check weighers involves the need to feed the capsules intermittently because weighing requires that each capsule remain on the check weigher, specifically a load cell, for a predetermined length of time.

Disadvantageously, these solutions are slow and lack flexibility. Feeding the capsules intermittently reduces the productivity of the machine and increasing the speed in the stretch where the capsule is in motion is not a desirable solution to overcome this drawback, since the capsules containing the granular or powder material are susceptible of damage on account of the high accelerations or vibrations.

Moreover, the use of support trays reduces the flexibility of the machine on account of the mutual positioning of the capsules dictated by the way the housings are distributed on the tray.

Aim of the Invention

The aim of the invention therefore is therefore to provide a support for transporting containers in a microwave inspection device, a device and a method for inspecting containers which overcome the above-mentioned drawbacks of the prior art.

More specifically, the aim of this invention is to provide a support for transporting containers in a microwave inspection device, a device and a method for inspecting containers which allow an increase in productivity.

A further aim of the invention is to provide a support for transporting containers in a microwave inspection device, a device and a method for inspecting containers which improve overall operating flexibility.

The aim is fully achieved by a support for transporting containers in a microwave inspection device, by a device and a method for inspecting containers according to the present disclosure invention.

According to the invention, there is a support specifically configured for transporting containers in a microwave inspection device. This function is at least implicitly found in the fact that the support has a supporting body, movable along a feed path, and at least two receiving seats connected to the top of the supporting body for being moved along the feed path in such a way that the receiving seats pass inside a resonant cavity whilst the support passes longitudinally through a gap obtained between two lower opposite lobes of the resonator, which delimit the bottom of the resonant chamber.

According to an embodiment, the supporting body has two or more supporting portions which are at least partly separated from each other by one or more openings and each carrying at least one respective receiving seat. Preferably, a single opening is made between two adjacent supporting portions, in the form of a recess gap extending vertically extending from an upper edge of the supporting body in a region between two receiving seats.

Preferably, the supporting portions adjacent to each other are connected to or integral with each other in a lower region of the supporting body. This gives the supporting body a "U" shape, in the case of two supporting portions, or a "comb-shape", in the case of a plurality of supporting portions.

Preferably, the supporting body is a single body and consecutive supporting portions are at least partly separated by an opening which extends from an upper edge of the supporting body to an intermediate portion of the supporting body, in particular up to the above-mentioned lower region, wherein the latter defines the rigid joining zone between the supporting portions. This makes the receiving seats of the same support integral with each other in the movement process through the microwave inspection device.

Preferably, the supporting member lies mainly in a main plane which, during transit through the microwave inspection device, lies parallel with the axis of movement, so that the supporting body can pass longitudinally through the lower gap of the resonator. More preferably, the supporting body has a plate-like shape, and in particular the supporting portions are coplanar with each other.

Preferably, the support is made of a single body of plastic material, preferably polyethylene. The monolithic body preferably comprising the supporting body, the plurality of receiving seats shaped in the form of a cup positioned on the top of the supporting body and, according to an embodiment, also a supporting base positioned below the supporting body.

Preferably, the receiving seats are aligned along an alignment direction designed to coincide with the direction of movement through the microwave inspection device.

Moreover, preferably, each supporting portion has a front edge and a rear edge relative to the alignment direction, wherein the front and rear edges have a shape which is symmetrical about an axis of symmetry or extension of the receiving portion. This shape reduces the measuring interference of each container, and of the relative supporting portion, due to the presence of the containers and/or adjacent supporting portions. The shape of the front and rear edges may be any, for example (but not necessarily) rectilinear (vertical), arched, curve.

The invention also relates to an inspection device for inspecting containers, in particular capsules, of the type containing a dose of a product in powder or granular form for the preparation of a food product. The device mainly comprises a conveyor, which extends along a closed line, equipped with a plurality of supports preferably made according to the invention as described above, configured for moving the receiving seats along a feed path between a station for loading containers inside receiving seats and a station for unloading the containers from the receiving seats, through a microwave detecting station in which the containers can transit one after the other.

Preferably, the microwave detection station comprises a microwave detector defining a detecting zone through which the individual containers pass one after another. The microwave detector comprises a waveguide element having a shape such as to encircle the detecting zone and preferably having the shape of a "U" or a "C".

More preferably, the waveguide element has two lower ends facing each other and forming between them a gap through which the supports pass, and more specifically the supporting bodies.

Preferably, the size of the gap, measured perpendicularly to the feed path, is smaller than the detection zone through which the containers (and the respective receiving seats of the supports) pass. Moreover, the transversal width of the gap is slightly greater than the thickness of the plate-like supporting body of the supports, so as to allow the passage of the supporting body of each support through the gap, with a minimum clearance required to prevent dragging. More specifically, the supporting body passes through the slot whilst the supporting body lies parallel with the feed path.

According to a preferred and particularly advantageous configuration, each supporting body is positioned in such a way that, during the transit of the supporting body through the gap, the openings between adjacent supporting portions extend at least partly, preferably entirely, inside the detecting zone and/or the gap. In this way, the detecting singularizing effect exerted by the opening is performed for the entire resonant space, maximising the advantage achieved.

The conveyor has a transport unit defining the feed path, for example a rotary table or a chain or belt conveyor, and a plurality of supports extending away from the conveyor unit transversally to said feed line and preferably in a vertical direction upwards.

According to an embodiment, each support is rotatable about an axis of oscillation or rotation (parallel to the axis of the rotary table or more generally perpendicular to a lying plane of the feed path) to adopt at least a first position wherein the receiving seats of the same support are aligned transversally, preferably perpendicularly, to the feed path, and a second position wherein the receiving seats of the same support are aligned along the feed path in such a way as to pass one after another through the detection zone.

Preferably, the device also comprises a processing unit configured to receive a measurement signal from the microwave detector and to generate an information item relating to at least one property of the container or of the dose contained therein, preferably density or weight.

Preferably, the processing unit is configured to generate, as a function of the measurement signal received from the microwave detector, an information item relating to at least one of the following: weight or density, type of product inside the container, presence of foreign bodies in the container.

Preferably, the processing unit is associated with a memory unit containing one or more reference models correlated with respective reference measurements and referred to different weight values of the container or of the product dose contained therein.

Preferably, the processing unit is configured to generate the information item by comparing the measurement received from the microwave detector with the reference models.

The invention also relates to an automatic packaging machine for containers, specifically capsules, containing a product in powder or granular form for the preparation of a food product. The machine comprises:

a unit for making a succession of containers, in particular filled with a predetermined dose of product; and an inspection device according to the invention, located downstream of the production unit.

According to an embodiment, the machine comprises a rejecting device located downstream of the inspection device, for eliminating from the feed line the containers deemed not compliant after inspection.

Preferably, the machine also comprises a feedback control system, connected to the production unit and to the inspection device and configured to perform at least one of the following corrective actions as a function of said information item generated by the processing unit of the inspection device (1):

modifying one or more operating parameters of the production unit, in particular of a device for filling the containers (100); and operating on the rejection device to reject one or more containers (100) considered non-conforming on the basis of the information item generated.

The invention also relates to a method for inspecting containers, in particular capsules, containing a dose of a product in powder or granular form for the preparation of a food product. The method, preferably actuated by using an inspection device according to the invention, comprising the steps of:

feeding a succession of containers, preferably continuously, along a feed path through a detection station, equipped with a microwave detector;

measuring each container by means of the microwave detector through the measuring station, to obtain a succession of measurements;

based on each measurement, generating an information item relating to at least one property of the container or of the dose contained therein, preferably density or weight.

Preferably, the steps of feeding the succession of containers and performing a detection on each container are carried out whilst the containers are supported by respective supports, wherein each support comprises a supporting body and at least two receiving seats connected to the top of the supporting body and each configured to contain a respective container. More preferably, the support is made according to the invention, in particular having two or more supporting portions which are at least partly separated from each other by one or more openings and each carrying at least one respective receiving seat, wherein the supporting portions are connected to each other or integral in a lower region of the supporting body. Preferably, the lower region of the supporting body, defining the (rigid) connection between the supporting portions is at least partly in transit outside the microwave detector in such a way as to reduce or eliminate data detection disturbances from the adjacent containers and/or supporting portions.

Preferably, the containers are fed along the feed path while supporting the containers in groups of two or more containers, wherein the containers of each group are positioned on the same support and aligned with each other along an alignment direction parallel to a plane in which the supporting body of each support lies.

According to an embodiment, each container is rotated about a respective axis of rotation or oscillation during each movement cycle (that is to say during each rotation of the rotating table) between at least a first position, obtained before and after the microwave detection step and wherein the containers of the same group are arranged in alignment transversely, preferably perpendicularly, to the feed path, and a second position, maintained at least during the microwave detection and wherein the containers of the same group are arranged in alignment along the feed path in such a way that they pass through the detection station in succession.

BRIEF DESCRIPTION OF THE DRAWINGS

The technical features of the invention, with reference to the above aims, are clearly described in the appended claims and its advantages are more apparent from the detailed description which follows, with reference to the accompanying drawings which illustrate a preferred, non-limiting example embodiment of it and in which

DETAILED DESCRIPTION OF PREFERRED EMBODIMENTS OF THE INVENTION

The numeral 1 in the accompanying drawings denotes in its entirety an inspecting device according to this invention. The inspecting device 1 is configured to inspect containers 100 of the type comprising an outer case containing a pre-dosed quantity of a material in granular or powder form for making an infusion drink (coffee, tea, tisanes or the like). In a preferred embodiment, these containers are capsules for preparing drinks of this kind and may, for example, have the shape of a downwardly tapering "cup".

The invention applies to unsealed containers, hence, for example, upstream of a station for applying a lid in order to close the outer case, or it may apply to containers that have already been sealed. Preferably, these containers are of non-metallic type.

The device 1 comprises a conveyor 2 in the form of a rotary carousel provided with a turntable 3 which rotates about a vertical axis of rotation X and on which a succession of supports 4 are disposed.

More specifically, the conveyor 2 has the function of transporting a succession of containers 100 of the type described above along a feed path A between a loading station 200 and an unloading station 300 by way of a detection station 400 configured to perform an electromagnetic, contactless inspection on the individual containers 100 whilst they feed through the detection station 400 with a detection direction parallel to the feed path "A".

The above mentioned supports 4 are distributed uniformly around the axis of rotation X of the turntable 3, specifically in a peripheral zone thereof, and extend away from the turntable 3 transversely to the feed path A, specifically along respective directions parallel to the axis of rotation X.

At the top of it, each support 4 is provided with one or more receiving cavities 5 configured to receive respective containers 100. According to the embodiment illustrated, each support 4 is equipped at the top with two receiving seats 5, however the number of receiving seats 5 could also be greater than two, with the receiving seats 5 aligned along an alignment direction preferably rectilinear, in particular parallel to the feed path "A".

Preferably, the receiving seats 5 of the same support 4 are aligned with each other in a single line for reasons that will become clearer as this description continues.

Figure 1:
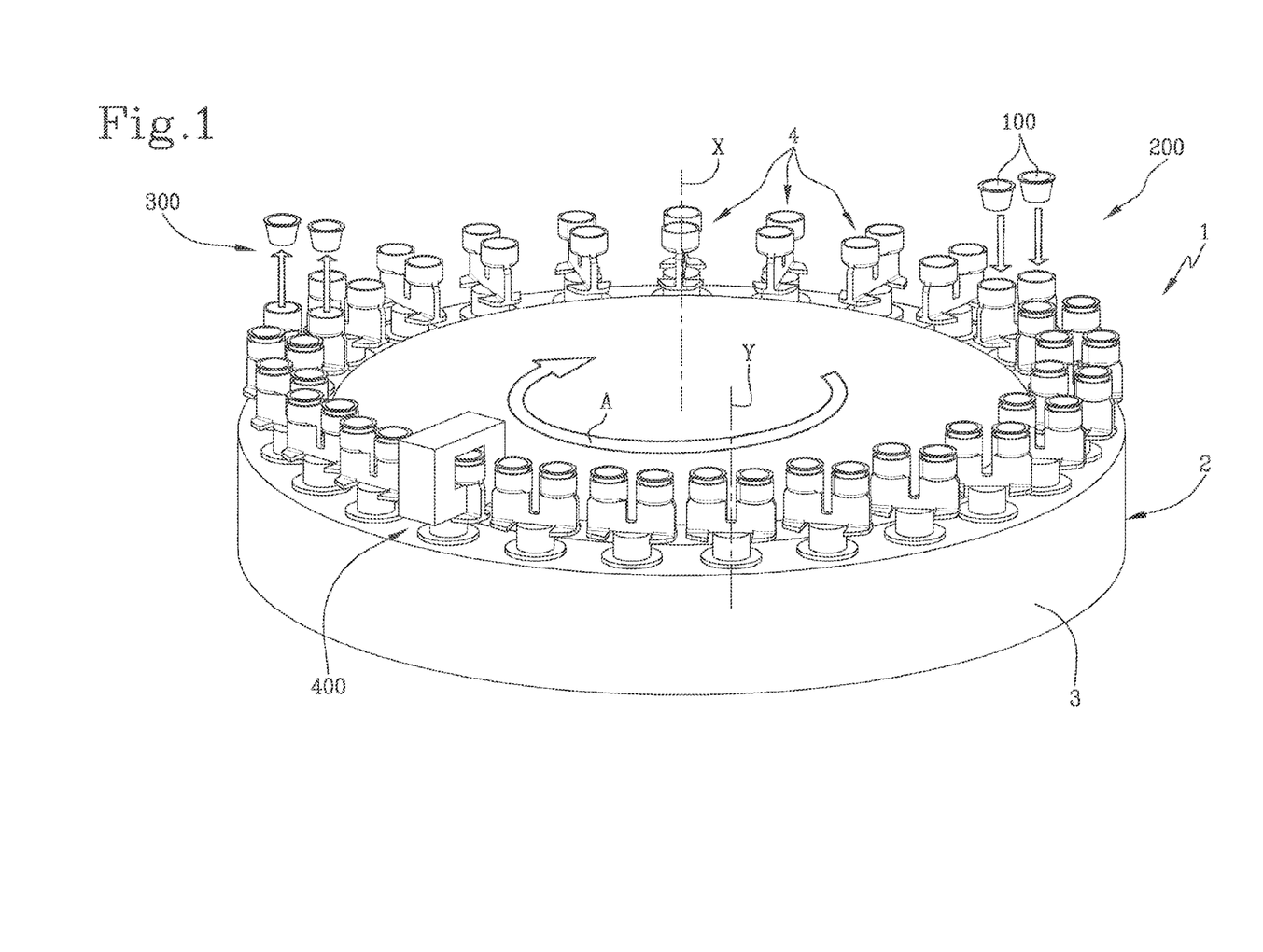
FIG. 1 shows a perspective view of a detecting device according to this invention.
Figure 2:
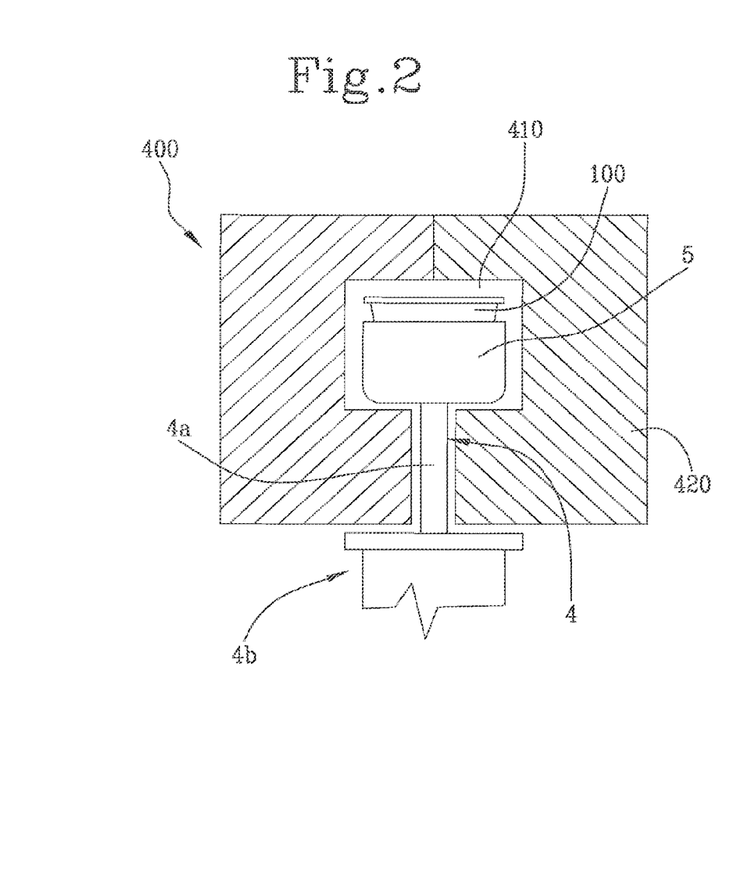
FIGS. 2 and 3 show, respectively, a cross section and a perspective view of a microwave detector used in the device of FIG. 1.

Each receiving cavity 5 is configured in the form of an open top "cup" which holds a respective container 100 by gravity by at least one bottom portion of the container 100 itself, as shown in FIGS. 1 and 2.

According to an advantageous aspect of the invention, each support 4 is mounted on the turntable 3 (or on a generic transporting element of the conveyor 2) rotatably about a respective swivel axis Y parallel to the axis of rotation X of the turntable 3. In such a configuration, the support 4 may adopt at least a first position (visible in the loading and unloading stations 200 and 300 in FIG. 1), where the receiving seats 5 of the same support 4 are positioned in alignment, transversely, preferably perpendicularly, to the feed path "A", and a second position (visible in the detection station 400 in FIG. 1), where the receiving seats 5 of the same support 4 are aligned along the feed path "A" in such a way that they pass singularly or in succession through the measuring station 400.

The supports 4 can be rotated about the respective swivel axes Y by respective independent actuators (for example, independently controllable electric motors) or by a mechanical transmission (for example, a cam system housed inside the turntable 3).

In a variant embodiment, the movement of the support 4 about its swivel axis Y might not be a swivelling movement between two end positions (that is to say, where the rotation is reversed) but it might be a full rotation, always in the same direction and, if necessary, intermittent.

In order to simultaneously load and simultaneously remove two or more containers 100 in the loading and unloading stations 200 and 300, respectively, there are provided suitable loading and unloading means (not illustrated) equipped with jaws which are configured to simultaneously grip and release two or more containers 100 and which are mounted on respective operating units of respective transfer wheels. The jaws are disposed in such a way as to release and pick up two or more containers 100 simultaneously while the containers are aligned in accordance with the aforementioned first position.

Figure 5:
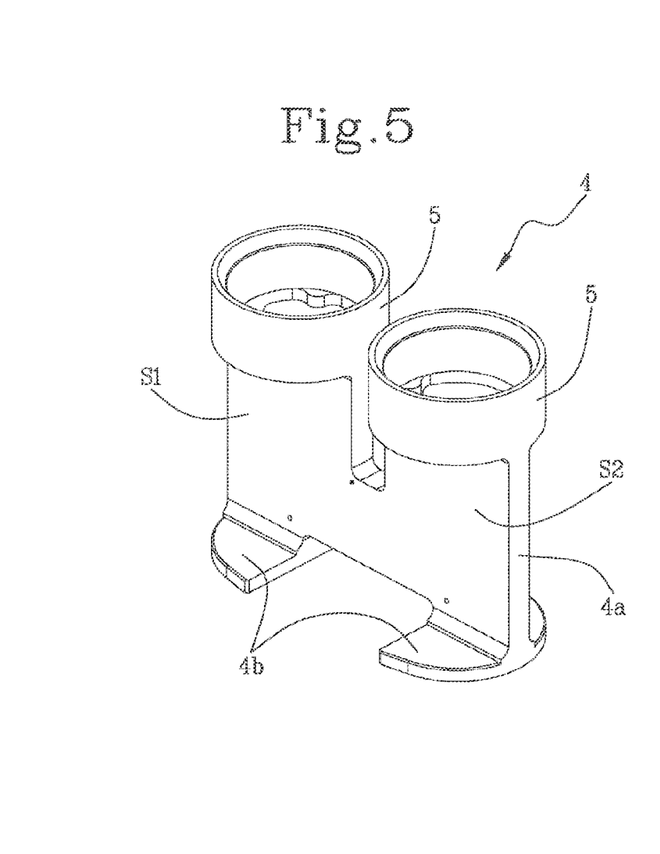
FIGS. 5 and 6 are, respectively, a perspective view and a cross section along a longitudinal plane of a support according to the invention and forming part of the device of FIG. 1.
Figure 6:
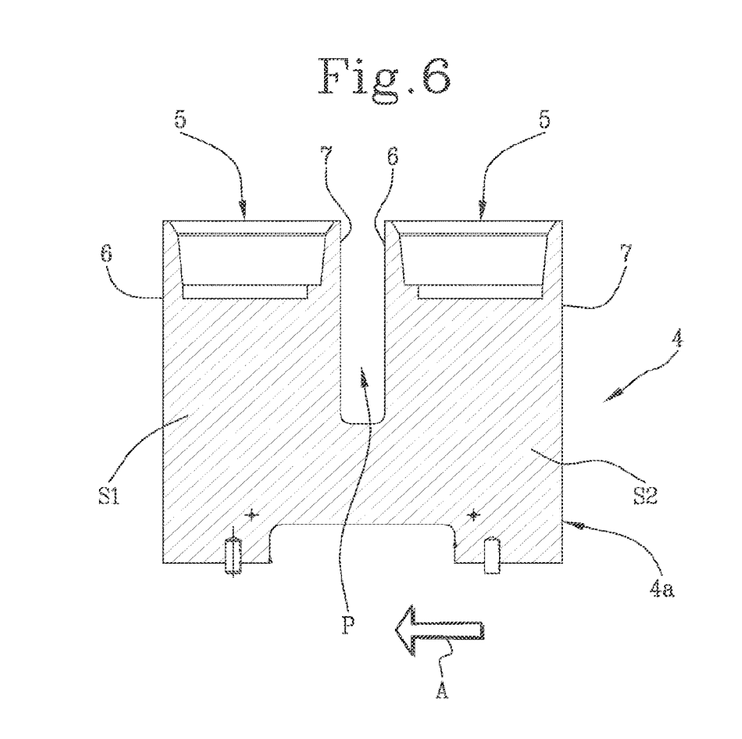

FIGS. 5 and 6 show in detail a preferred embodiment of the supports 4.

Each support 4 has, beneath the receiving seats 5, a supporting body 4a mounted on the rotary table 3 and designed to support the receiving seats 5 in the movement along the feed path "A", preferably in a rotatable fashion about said axis of oscillation "Y".

Preferably, the supporting body 4a has a plate-like shape having a main vertical lying plane parallel to the above-mentioned direction of alignment of the receiving seats 5.

The supporting body 4a is connected at the bottom to a supporting base 4b, formed by one or more plate-shaped portions lying perpendicular to the supporting body 4a and in particular horizontal.

Advantageously, the supporting body 4a has two or more supporting portions "S1", "S2" which are at least partly separated from each other by one or more openings "P" and each carrying at the top at least one respective receiving seat 5. Said supporting portions "S1", "S2" are connected to each other or integral in a lower region of the supporting body 4a in such a way as to give the supporting body 4a a rigid structure and move.

More in detail, consecutive supporting portions "S1", "S2" are at least partly separated by an opening "P" open at the top, that is to say, extending from an upper edge of the supporting body 4a to an intermediate portion of the supporting body 4a, in particular up to the above-mentioned lower region, in such a way that there is a lower zone of rigid connection between the supporting portions "S1", "S2".

Moreover, the receiving seats 5 are also detached from each other. In this way, the receiving seats 5 of the support 4 are made integral with each other exclusively by a connection in the above-mentioned lower zone of rigid connection.

The supporting portions "S1", "S2" are coplanar with each other, being defined by the same plate-shaped supporting body 4a.

Due to the presence of the above-mentioned opening "P", the supporting body 4a has the shape of a "U" in the case of two receiving seats 5. However, if the support 4 has more than two receiving seats 5, separated by respective openings, the supporting body 4a would have the "comb-shape".

Preferably, the support 4 is made of a single body of plastic material, preferably polyethylene, which comprises the supporting body 4a, two or more receiving seats 5 shaped in the form of a cup positioned on the top of the supporting body 4a and the supporting base 4b positioned below the supporting body 4a.

According to a preferred embodiment, each supporting portion "S1", "S2" has a front edge 6 and a rear edge 7 relative to the direction of movement along the feed path "A", which has a shape symmetrical relative to an axis (vertical) of symmetry or of extension of the respective receiving portion 5. The advantage of this feature is explained in more detail below.

The measuring station 400 is configured to measure each container 100 while the container 100 is being supported and moved (preferably with continuous motion—that is to say. at a constant speed or tangential speed) by the conveyor 2. For this purpose, the conveyor 2 is set in rotation at a constant angular speed.

More in detail, the measuring station 400 comprises a microwave detector provided with a measuring zone 410 through which each container 100 passes, in accordance with a feed logic whereby the measuring zone 410 is crossed by one container 100 at a time.

Preferably, the measuring station 400 comprises a single microwave detector through which a succession of containers 100, aligned in a single longitudinal line, pass in such a way that the containers 100 pass through the microwave detector one at a time.

Preferably, the microwave detector is a resonator and the measuring zone 410 is a resonant cavity.

The microwave detector preferably also comprises a waveguide element 420 having a shape such as to encircle the measuring zone 410, preferably the shape of a U or a C whose opening faces down (that is to say, towards the conveyor 2). In detail, as may be seen in FIGS. 2 and 3, the waveguide element 420 of the microwave detector is substantially in the shape of a ring, whose interior defines a cavity—that is to say, the measuring zone 410.

Figure 3:
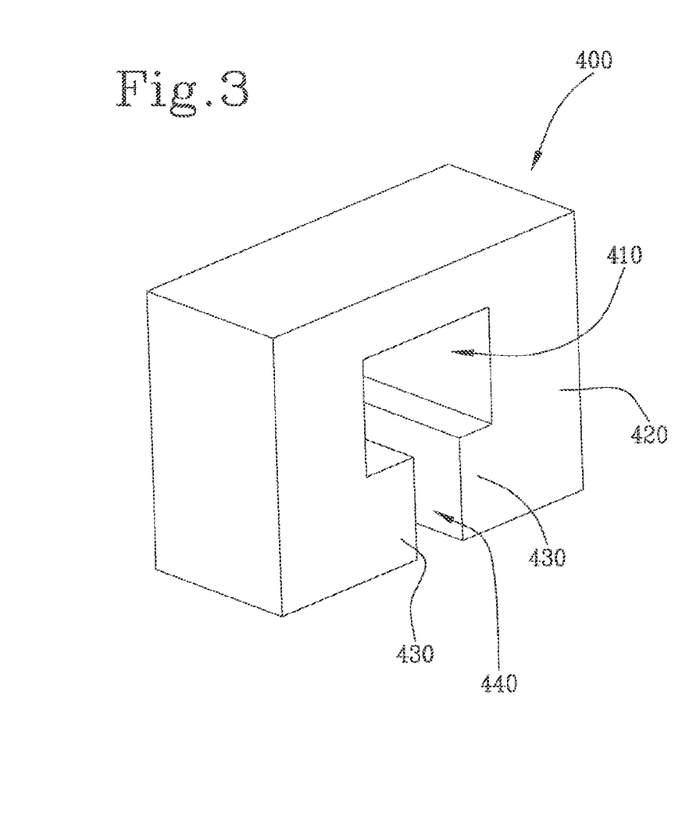

The waveguide element 420 has two facing ends 430 defining between them a gap 440 through which the supports 4 pass one after the other.

The gap 440, facing towards the conveyor 2, measured perpendicularly to the feed path A, is smaller in size (or in width) than the measuring zone 410, so that the measuring zone 410 is partly delimited at the bottom by the above mentioned ends 430.

Moreover, the plate shaped supporting body 4a of each support 4 is smaller in thickness than the gap 440 so that the supporting body 4a can pass through the gap 440 when the corresponding support 4 adopts the above-mentioned second position (FIG. 2).

According to an advantageous aspect of the invention, each supporting body 4 is positioned at a height such that, during the transit of the supporting body 4a through the gap 440, the openings "P" extend inside the detection zone 410 and/or the gap 440 and, preferably, in such a way that the lower connecting zone which joins in a rigid fashion the supporting portions "S1", "S2" passes at least partly, preferably, under the detection zone 410 and/or the gap 440. In this way, the previous and subsequent interference with the receiving seats, which could alter the each single detection of a receiving seat 5, can be eliminated from the single detection during the transit through the detection station 400. In this situation, the transit of the opening "P" between the current supporting portion "S1", "S2" and the supporting portion "S1", "S2" before or after determines a substantial zero-setting of the reading by the microwave detector, allowing each container 100 to be measured very precisely.

The device 1 also comprises a processing unit (not illustrated) configured to receive a measurement signal from the microwave detector and to generate an information item relating to at least one property of the content of the container.

According to an embodiment, the at least one property is at least one of the following: weight of the container 100 as a whole or of the dose of product contained therein, type of product inside the container 100, presence of foreign bodies in the container 100. In a preferred selection, the property measured is at least the density or weight of the content or of the container as a whole (thus including the outer case).

More specifically, the processing unit allows identifying different properties of the container and/or of the contents thereof as detected by the microwave detector and, with reference in particular to the type of product inside the container 100, it not only allows determining the type of content (for example, distinguishing between tea, coffee or other) but it also allows distinguishing between different grades or brands of products of the same type (for example, different brands of coffee powder).

In a preferred embodiment, the step of generating the information item is carried out by comparing the measurement received from the microwave detector with a suitable selection of reference models, specifically preset reference models stored in a storage unit, following a specific calibrating procedure, for example. The reference models may refer to different values of weight and/or different types and/or properties of the product inside the container and/or different situations in which foreign bodies are present in the container, in particular by associating different "information items" with different reference measurements.

That way, the processing unit may call up one or more reference models stored in a storage unit and correlated with respective reference measurements and may then make a comparison between the reference measurements associated with these models and the real measurement received from the microwave detector, thus identifying the model that is closest to the current situation being measured.

Advantageously, thanks to the symmetrical shape of the front and rear edges 6, 7 of the supporting portions "S1", "S2", any disturbances due to the shape of the support during the measurement are compensated between the inlet and the outlet of each supporting portion.

Figure 7:
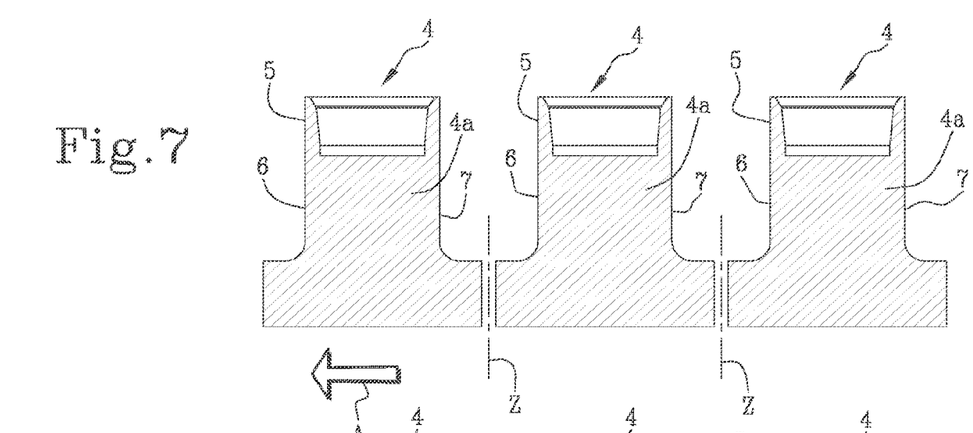
FIGS. 7 and 8 are cross sections, along a longitudinal plane, of a support for transporting containers in a microwave inspection device according to variant embodiments.
Figure 8:
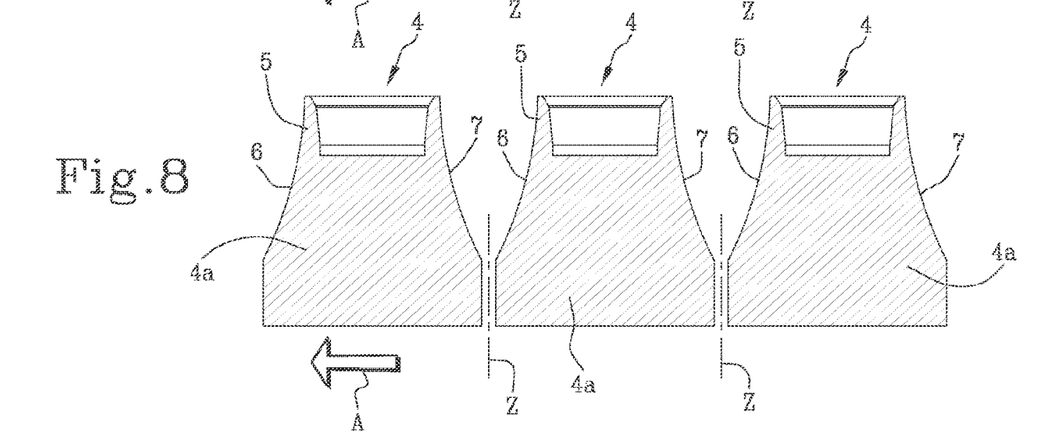

According to an alternative embodiment, the supports 4 carrying the receiving seats 5 are not individually mounted on a rotary table 3 but may be configured as components of a single conveyor with a closed loop, for example of the chain type. More specifically, FIGS. 7 and 8 show an alternative embodiment wherein each support 4 is connected to the supports before and after in an articulated fashion, for example by hinge articulations defining respective hinge axes "Z" parallel to each other. The articulated connection may be performed at a lower zone of the supporting members 4a, as shown in FIGS. 7 and 8, or at lateral zones (embodiment not illustrated). Moreover, according to these variant embodiments the number of receiving seats 5 for each support 4 may be equal to one or a plurality.

Moreover, also in these variant embodiments it is preferable to provide the above-mentioned presence of the front and rear edges 6, 7 which are symmetrical to each other relative to a vertical axis of the support 4 (for example, the axis of the receiving seat 5, in the solutions illustrated in FIGS. 7 and 8).

The device described above may form part of a machine for packaging the containers and comprising a unit for the production of a succession of the containers and, downstream of it, an inspection device 1 according to the invention.

The machine also comprises a rejection device, located downstream of the inspection device 1, and a feedback control system, connected to the production unit and to the inspection device and configured to perform at least one of the following corrective actions as a function of the information item generated by the processing unit of the inspection device 1:
- modifying one or more operating parameters of the production unit, in particular of a device for filling the containers (to correct any dosing or filling errors), and
- operating the rejection device to reject one or more containers considered non-conformant on the basis of the information item generated—for example, containers containing foreign bodies or whose weight is outside a predetermined tolerance range.

Described below is an inspection method according to the invention and, in particular, implemented by an inspection device of the type described above.

The method comprises the following steps:
- feeding a succession of containers 100 along a feed path A through a microwave measuring station 400;
- measuring each container 100 by means of microwaves while the container 100 is made to pass through the measuring station 400, to obtain a succession of measurements;
- based on each measurement, generating an information item relating to at least one of the following: weight of the container as a whole or of the dose of product contained therein, type of product inside the container, presence of foreign bodies in the container.

As the containers 100 advance along the feed path "A", they are supported in groups of two or more by means of supports 4 of the type described above, where the containers 100 of each group are positioned in alignment with each other; and each group is rotated about a respective swivel axis Y between the first and the second position.

Figure 4:
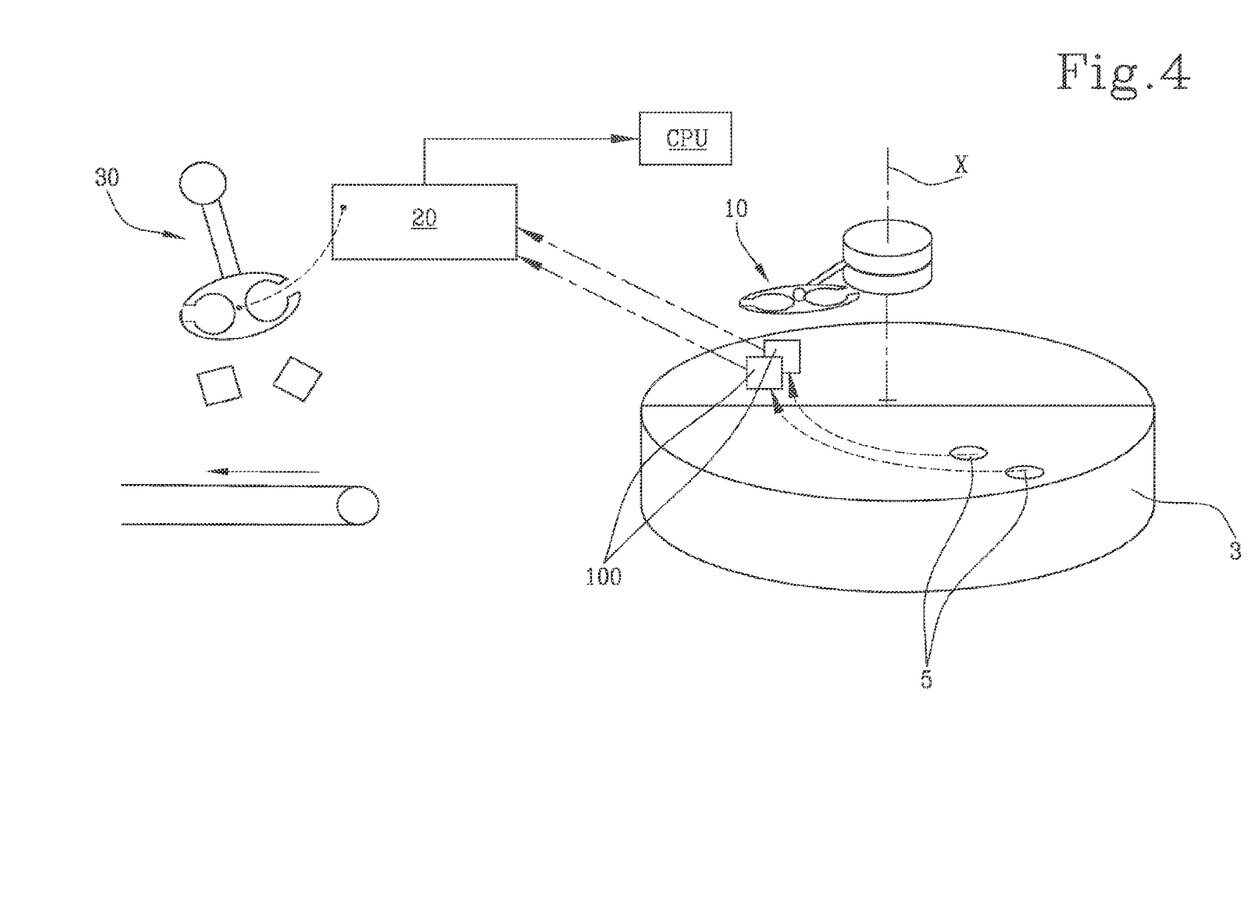
FIG. 4 schematically illustrates a container calibrating procedure according to the invention.

The inspection device 1 according to the invention may be subjected to a calibrating process as schematically represented in FIG. 4, for example, a periodic calibration.

In accordance with this process, one or more containers 100 are picked up by the conveyor 2 by means of special pickup means 10 which transfer the containers 100 (for example, by means of screw conveyors or the like) to a check weigher 20 which sends its measurements to the processing unit (CPU) so they can be compared with corresponding measurements taken by the microwave detector 400.

After being weighed by the check weigher 20, the containers 100 are removed by a removing device 30, which unloads the containers to an expulsion or recycling line.

The comparison (performed preferably by the processing unit) between the measurement taken with the check weigher 20 and the corresponding measurement taken with the microwave detector 400, preferably before the containers 100 are picked up from the conveyor 2 by the pickup means 10, allows identifying possible discrepancies and applying a corrective action on the inspection device 1 if the result of the comparison is a difference greater than a predetermined value.

According to a further aspect of the invention, a reference control check of the device 1 is performed. According to the reference control check, the inspection method is applied to one or more reference pieces (made, for example, of high-density polyethylene or PEEK) having precise, well-known properties and having the same shape as the regular containers inspected.

Loading and removing the reference pieces to and from the conveyor may be done manually using the same means 10, 30 used for calibration or using dedicated means.

Once subjected to microwave measurement in the microwave detector, the measurements obtained are compared by the processing unit with corresponding reference measurements (preset and, for example, retrievable from the storage unit). In the case of differences outside a tolerance range, further diagnostic steps or corrective and/or maintenance action may be taken on the device 1. For example, a very different measurement might indicate the presence of damp in the resonant chamber, requiring adequate maintenance action.

The invention as described in the foregoing is susceptible of several variations, not expressly illustrated but all falling within the scope of the inventive concept.

In particular, the conveyor might not be a turntable but might be made in the form of a linear conveyor, a closed loop conveyor or other kind of conveyor—that is to say, a generic transporting means defining the feed path-provided always that it is equipped with a succession of supports made as described above and subject to the same considerations regarding the number of receiving cavities and the possibility of swivelling.

The present invention achieves the preset aims, overcoming the disadvantages of the prior art.

The ability of the inspection device to take measurements of individual containers by means of a contactless system, specifically electromagnetic and, still more specifically, by means of a microwave measurement system, allows productivity to be increased because the inspection device (and, by extension, the entire packaging machine) can operate with continuous motion and no longer necessarily intermittently.

Productivity is further increased by the fact that the conveyor is able to work with a double line of containers, which are longitudinally repositioned and aligned with each other only in the stretch of the feed path where they are individually inspected through microwave measurement, while loading and unloading operations are performed on pairs of containers. Moreover, this feature makes it possible to reduce the loading and unloading speed, thereby reducing the risk of damaging the containers.

Moreover, the special shape of the supports allows the measuring precision to be increased by singling the readings for each container, reducing the disturbances created by the adjacent containers.

Lastly, moving the containers individually, avoiding the use of trays or support plates, allows improving production efficiency because it does not require a fixed, static arrangement of the containers according to predetermined positioning arrays.

The invention claimed is:

1. An inspection device for inspecting containers, each containing a dose of a product in powder or granular form for preparation of a food product; the device comprising:
a conveyor including a plurality of supports for transporting containers, each of the supports comprising: a supporting body which is movable along a feed path;
at least two receiving seats detached from each other and connected to a top of the supporting body to be moved along said feed path;
wherein said supporting body has two or more supporting portions which are at least partly separated from each other by one or more openings and each of the supporting portions carrying at least one respective receiving seat, said supporting portions being connected or integral with each other in a lower region of the supporting body;
the conveyor configured for moving said receiving seats along the feed path between a loading station for loading containers inside the receiving seats and an unloading station for unloading the containers from the receiving seats;
a detection station located along said feed path between the loading station and the unloading station and configured to inspect each container while the container is supported and moved by said support of the conveyor;
wherein said detecting station comprises a microwave detector including a detection zone through which said containers pass one after the other in succession.

2. The device according to claim 1, wherein said microwave detector comprises a waveguide element having a shape such as to encircle the detection zone, and wherein said waveguide element has two facing ends defining between them a gap through which the supports pass, said gap, measured perpendicularly to the feed path, being smaller in size than the detection zone through which said containers pass and such as to allow the passage of the supporting body of each support, said supporting body passing through said gap whilst said supporting body lies parallel to the feed path.

3. The device according to claim 2, wherein each supporting body is positioned such that, during the transit of the supporting body through the gap, said openings extend inside the detection zone and/or the gap.

4. The device according to claim 1, wherein said conveyor has a conveying unit defining said feed path and a plurality of the supports extending away from the conveying unit transversally to said feed direction, each support being rotatable about a swivel axis to adopt at least a first position, wherein said receiving seats of the support are positioned in transversal alignment to the feed path, and a second position, wherein the receiving seats of the support are positioned in alignment along the feed path to pass through the detection zone in succession, the supporting body of each support having a thickness smaller than said gap to pass through said gap when the support adopts said second position.

5. The device according to claim 1, wherein said conveyor is a carousel which rotates about an axis of rotation, and wherein said swivel axis is parallel to the axis of rotation.

6. The device according to claim 1, and further comprising a processing unit configured to receive a measurement signal from said microwave detector and to generate an information item relating to at least one property of the container or of the dose contained therein, the processing unit being configured to generate, as a function of the measurement signal received from the microwave detector, an information item relating to at least one of the following: weight or density, a type of product inside the container, and/or a presence of foreign bodies in the container.

7. The device according to claim 6, wherein the processing unit is operatively connected with a memory unit containing one or more reference models correlated with respective reference measurements and referred to different weight values of the container or of the product dose contained therein; the processing unit being configured to generate the information item by comparing the measurement received from the microwave detector with the reference models.

8. An automatic packaging machine for containers containing a product in powder or granular form for preparation of a food product, comprising:
a unit for production of a succession of containers;
an inspection device according to claim 1, located downstream of the production unit;
a rejection device, located downstream of the inspection device;
a feedback control system, connected to the production unit and to the inspection device and configured to perform at least one of the following corrective actions as a function of the information item generated by the processing unit of the inspection device:
modifying one or more operating parameters of the production unit; and
operating on the rejection device to reject one or more containers considered non-conforming based on the information item generated.

9. An inspection method for inspecting containers, the containers being capsules, containing a dose of a product in powder or granular form for preparation of a food product, comprising the following steps:
providing an inspection device for inspecting containers, each containing a dose of a product in powder or granular form for preparation of a food product; the device comprising:
a conveyor including a plurality of supports for transporting containers, each of the supports comprising:
a supporting body which is movable along a feed path;
at least two receiving seats detached from each other and connected to a top of the supporting body to be moved along said feed path;
wherein said supporting body has two or more supporting portions which are at least partly separated from each other by one or more openings and each of the supporting portions carrying at least one respective receiving seat, said supporting portions being connected or integral with each other in a lower region of the supporting body;

the conveyor configured for moving said receiving seats along the feed path between a loading station for loading containers inside the receiving seats and an unloading station for unloading the containers from the receiving seats;

a detection station located along said feed path between the loading station and the unloading station and configured to inspect each container while the container is supported and moved by said support of the conveyor;

wherein said detecting station comprises a microwave detector including a detection zone through which said containers pass one after the other in succession;

feeding a succession of the containers along the feed path through the detection station;

measuring each container with the microwave detector through the measuring station, to obtain a succession of measurements;

based on each measurement, generating an information item relating to at least one property of the container or of the dose contained therein.

10. The method according to claim 9, wherein the step of feeding a succession of containers along the feed path is carried out:

supporting the containers in groups of two or more containers, wherein the containers of each group are positioned on the same support and aligned with each other along an alignment direction; and rotating each support about a respective swivel axis between at least a first position, obtained before and after the microwave detection step and wherein the containers of the same group are arranged in alignment transversely to the feed path, and a second position, maintained at least during the microwave detection and wherein the containers of the same group are arranged in alignment along the feed path to pass through the detection station in succession.

* * * * *